United States Patent
Beaucoup et al.

(10) Patent No.: US 7,831,036 B2
(45) Date of Patent: *Nov. 9, 2010

(54) METHOD TO REDUCE TRAINING TIME OF AN ACOUSTIC ECHO CANCELLER IN A FULL-DUPLEX BEAMFORMING-BASED AUDIO CONFERENCING SYSTEM

(75) Inventors: Franck Beaucoup, Ontario (CA); Michael Tetelbaum, Onatrio (CA)

(73) Assignee: Mitel Networks Corporation, Ottawa Ontario (CA)

(*) Notice: Subject to any disclaimer, the term of this patent is extended or adjusted under 35 U.S.C. 154(b) by 1133 days.

This patent is subject to a terminal disclaimer.

(21) Appl. No.: 11/381,788

(22) Filed: May 5, 2006

(65) Prior Publication Data

US 2006/0250998 A1 Nov. 9, 2006

(30) Foreign Application Priority Data

May 9, 2005 (EP) .................................. 5103821

(51) Int. Cl.
*H04M 9/08* (2006.01)
(52) U.S. Cl. ........................... 379/406.08; 379/406.11; 379/286; 379/290
(58) Field of Classification Search ................. 370/286; 379/406.01, 406.1, 406.09
See application file for complete search history.

(56) References Cited

U.S. PATENT DOCUMENTS

| 5,428,604 A | 6/1995 | Fuda |
| 6,049,607 A * | 4/2000 | Marash et al. ......... 379/406.08 |
| 2002/0015500 A1 | 2/2002 | Belt et al. |
| 2004/0120511 A1 | 6/2004 | Beaucoup et al. |

FOREIGN PATENT DOCUMENTS

CA 2413217 A1 5/2004

* cited by examiner

*Primary Examiner*—Fan Tsang
*Assistant Examiner*—Simon King

(57) ABSTRACT

A method is set forth for reducing the total acoustic echo cancellation convergence time for all look directions in a microphone array based full-duplex system. The method is based on capturing the loudspeaker signal due to the first far-end speech bursts when the conferencing system is first used, as well as the corresponding loudspeaker feedback signals in the individual microphones. The captured signals are then used for consecutive adaptation of the acoustic echo canceller on all echo paths corresponding to all look directions of the beamformer, thereby training the AEC. This training process can be executed concurrently with normal phone operation, for example, as a background process that utilizes available processing cycles.

6 Claims, 4 Drawing Sheets

METHOD TO REDUCE TRAINING TIME OF AN ACOUSTIC ECHO CANCELLER IN A FULL-DUPLEX BEAMFORMING-BASED AUDIO CONFERENCING SYSTEM

CROSS-REFERENCE TO RELATED APPLICATION

This application claims priority to European patent application number 05103821.4 filed on 9 May 2005, titled A Method to Reduce Training Time of an Acoustic Echo Canceller in a Full-Duplex Beamforming-Based Audio Conferencing System, the entire disclosure of which in incorporated herein for any and all purposes.

BACKGROUND OF THE INVENTION

1. Field of the Invention

The present invention is directed to audio conferencing systems, and more particularly to a method of reducing the training time of an acoustic echo canceller in a full duplex audio conferencing system using beamforming.

2. Description of the Related Art

Spatial directivity is highly desirable for sound pickup in audio conferencing systems for the purpose of attenuating room noises, interference, and reverberations, thereby enhancing the quality of near-end speech. Spatial directivity can be achieved either by utilizing directional microphones or through a combination of beamformer and a plurality of omnidirectional microphones arranged as a microphone array. The latter approach is preerable as it provides greater directivity, flexibility and cost efficiency compared to the use of directional microphones.

Echo effects represent a well known problem in hands-free audio conferencing systems. Undesirable echo effects result from the loudspeaker signal being picked up by the microphone(s) and then transmitted back to the far-end party. The typical industry requirement for echo attenuation is on the order of 40 dB. In the case of a desktop phone, the proximity of the loudspeaker to the microphones, combined with the high loudspeaker volume and required transmit gain, makes the echo problem particularly difficult to deal with. Although beamforming can contribute to the suppression of the loudspeaker echo signal due to its inherent spatial directivity, a practical fixed or adaptive beamformer cannot satisfy this requirement alone. Therefore in practice, conference or speakerphone design requires the use of a traditional Acoustic Echo Cancellation (AEC) in combination with beamforming to achieve high-quality full-duplex operation.

Several prior art references discuss the combination of acoustic echo cancellation with beamforming (see M. Branstein and D. Ward, "Microphone Arrays. Signal Processing Techniques and Applications". Springer Verlag, 2001, and H. Buchner, W. Herbordt, W. Kellermann, "*An Efficient Combination of Multi-Channel Acoustic Echo Cancellation With a Beamforming Microphone Array*", Proc. Int. Workshop on Hands-Free Speech Communication (HSC), pp. 55-58, Kyoto, Japan, April, 2001). In one approach, acoustic echo cancellation is performed on all the microphone signals in parallel, which is computationally intensive. A second approach is to perform acoustic echo cancellation on the spatially filtered signal at the output of the beamformer. The challenge in the latter case results from the fact that the transfer function between the loudspeaker and the spatially filtered signal is time varying as the beamformer changes its look direction. In the case where a predefined number of beamformers are used to cover the desired spatial span of the sound pickup, each beamformer presents its own set of characteristics that depend on the spatial area it covers, such as the direct path, reflections, background noise and local interference signals. Therefore the AEC has to deal with changes in the echo path each time the beamformer changes its look direction. This can result in a significant degradation of the full-duplex performance.

One method of dealing with the problem of transitioning from sector-to-sector is presented in CA 2,413,217 (Franck Beaucoup and Michael Tetelbaum), entitled "A method of acoustic echo cancellation in full-duplex hands free audio conferencing with spatial directivity". This invention addresses the problem of multiple look directions by storing and retrieving the unique echo canceller information for each sector from dedicated workspaces. This method facilitates echo cancellation once the AEC has already converged (i.e. when the far-end speech has exercised and trained the AEC to the echo path of a particular direction), prior to switching look directions. However, this approach does not address the problem of requiring initial convergence on each sector. For example, when a call is first set up and bi-directional conversation begins, the beamformer will point to a particular spatial sector in response to the first active near-end talker, thereby allowing adaptation of the echo canceller for this particular sector during segments of far-end speech. However, if the talker changes position to an "unused" sector (or a new talker becomes active), then the echo canceller must re-converge on the new sector. This means that all filter coefficients are initially zero for the new sector, resulting in undesirable echo effects because the AEC remains in a "non-converged" state. Until an acceptable level of echo canceller convergence is obtained, the system may be unstable, resulting in echo and howling effects.

Although some measures can be adopted to prevent these effects (for instance, gain loss can be applied to reduce the level of the feedback signal), such measures typically degrade the full-duplex performance of the system. Therefore it is an object of an aspect of the invention to reduce the AEC training time as much as possible.

The prior art does not appear to set forth any methods dealing specifically with initial convergence of an acoustic echo canceller in conferencing systems having more than one look direction (and correspondingly multiple echo paths). There are, however, several well-known methods of reducing start-up echo and howling effects for a single echo path. These methods are based on various schemes of applying switched loss on the speaker and/or microphone signals until the echo canceller adapts sufficiently to ensure a reasonable level of echo cancellation. For example, see U.S. Pat. No. 4,560,840 entitled Digital Handsfree Telephone, by Hansen Bjorn, assigned to International Standard Electric Corp. However, in general these methods result in a degradation of the subjective quality of the system. It is not known in the art to apply these techniques to an AEC in the case of multiple echo paths, due to the problem of minimizing the total time of convergence on all echo paths, so that the degradation in quality remains minimal.

Another group of prior art methods is based on training the system AEC prior to its use for the first call. These methods make use of training signals played through the loudspeaker at system start-up (i.e. the first time the speakerphone is powered up). One example of such a prior art approach is set forth in U.S. Pat. No. 5,428,604, Training Method for an Echo Canceller for Use in a Voice Conference System, assigned to NEC Corporation. A drawback of this approach is that it requires playback of a loud training signal through the speaker for a time duration that is sufficient to achieve an acceptable level of convergence in the acoustic echo canceller. This training sound may be annoying for the user, especially where the AEC has to be trained for multiple echo paths thereby giving rise to a long duration of the training sound.

SUMMARY OF THE INVENTION

According to the present invention, a method is set forth for reducing the total acoustic echo cancellation convergence time for all look directions in a microphone array based full-duplex system. The method is based on capturing the loudspeaker signal due to few far-end speech bursts when the conferencing system is first used, as well as the corresponding loudspeaker feedback signals in the individual microphones. The captured signals are then used for consecutive adaptation of the acoustic echo canceller on all echo paths corresponding to all look directions of the beamformer, thereby training the AEC. This training process can be executed concurrently with normal phone operation, for example, as a background process that utilizes available processing cycles.

According to the present invention, the beamformer and the AEC operate on the captured signals whenever they are not operating in real-time on the far-end and near-end signals. Typically, a conference system is designed to have sufficient processing resources to provide all required call processing functionality. This may include call setup and tear-down, audio streaming and voice enhancement functionality such as echo cancellation, noise suppression, beamforming, etc. Depending on the Call State and scenario, some of these processing functions may run concurrently while others may be invoked sequentially. Therefore the processing workload is not uniformly distributed in time, wherein maximum processing power is budgeted to cover the worst-case workload. This inevitably creates processing under-load at some time intervals. For example, during segments of conversation such as double-silence, near-end speech, or double-talk, the AEC is normally passive (i.e. the adaptation is frozen), such that CPU cycles that would otherwise be used for the AEC adaptation become available for processing the recorded signals. In general, the training process can be performed any time there are available processing resources. This background echo canceller training activity results in fast initial convergence for all sectors. The training happens concurrently with normal call voice processing and therefore is unnoticeable to the conferencing parties.

DETAILED DESCRIPTION OF THE PREFERRED EMBODIMENT

Figure 2:
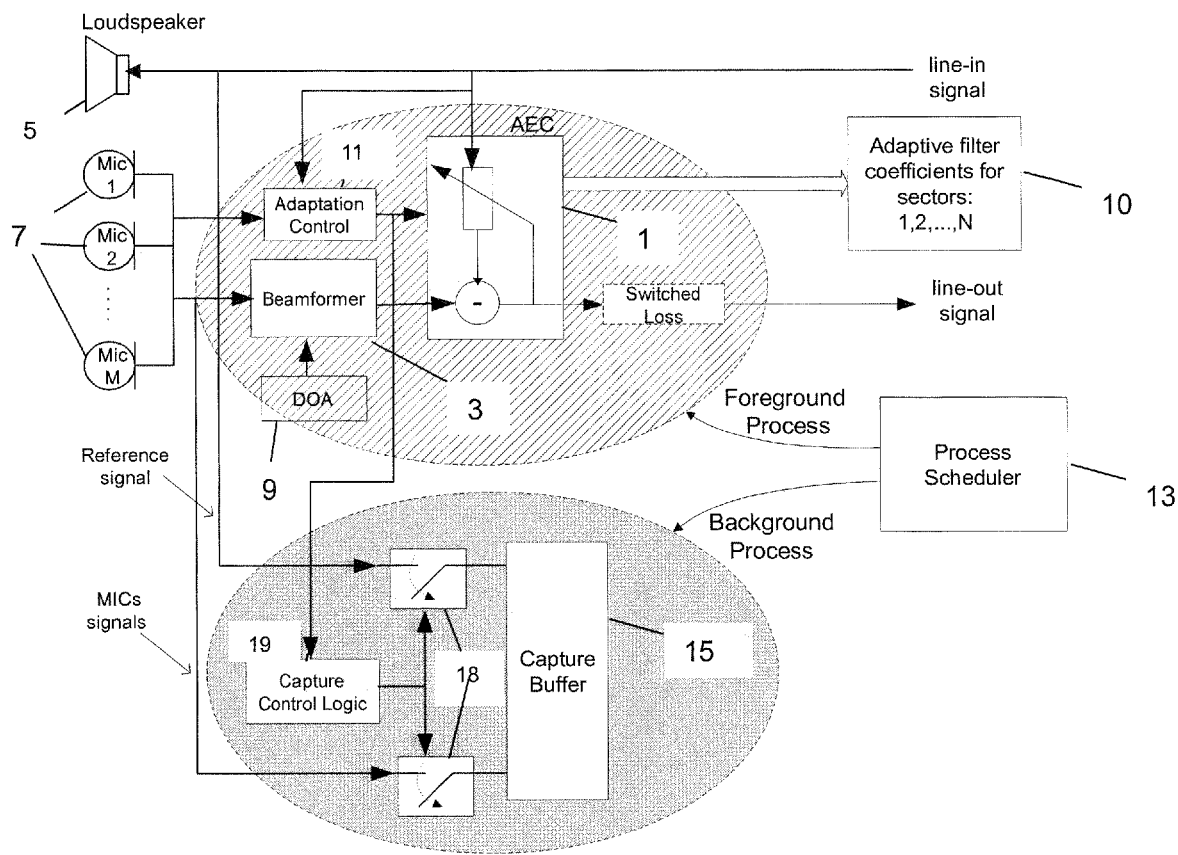
FIG. 2 is a block diagram showing a capture training signals operating mode of the acoustic echo canceller of FIG. 1, according to the present invention.
Figure 3:
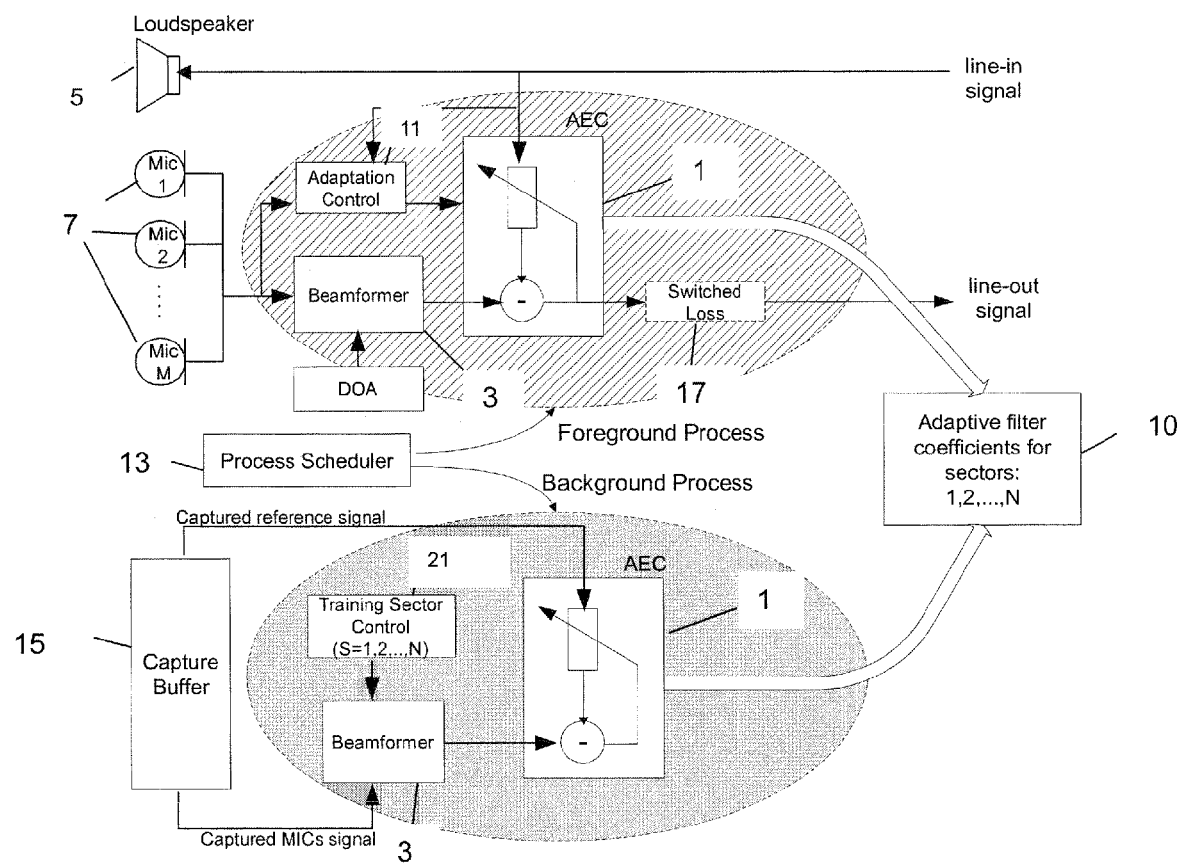
FIG. 3 is a block diagram showing a processing captured training signals operating mode of the acoustic echo canceller of FIG. 1, according to the present invention.

According to the present invention, three modes are provided for operating an acoustic echo canceller with adaptive control in a full duplex audio conferencing system with beamformer, namely: Normal Mode, Capturing Training Signals Mode and Processing Training Signals Mode (FIGS. 1, 2 and 3, respectively).

Figure 1:
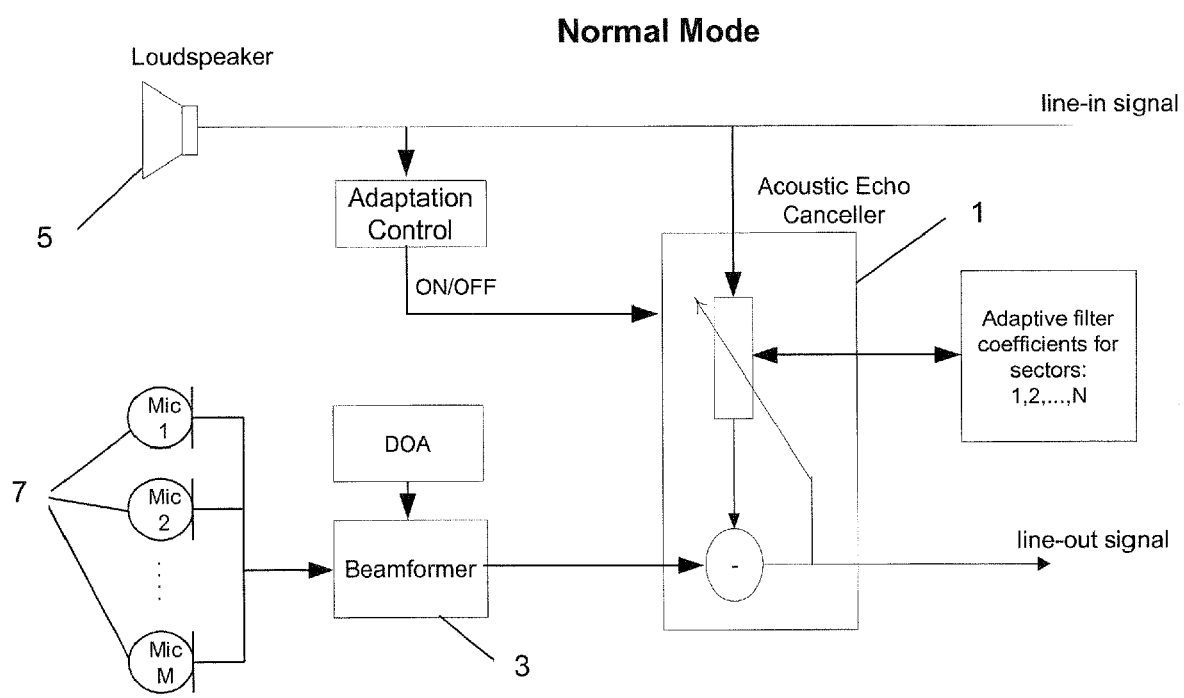
FIG. 1 is a block diagram showing a normal operating mode of an acoustic echo canceller with adaptive control in a full duplex audio conferencing system with beamformer, according to the prior art.

In the Normal Mode (also referred to herein as mode 1), the AEC 1 and the beamformer 3 operate on real-time signals (FIG. 1). The far-end signal is fed to the loudspeaker 5 and is also used as the AEC reference signal whereas the signals from microphones 7 are fed to the beamformer 3. The beamformer generates an output signal for a particular spatial area (or look direction) as specified by the Direction of Arrival (DOA) estimator block 9. The output of the beamformer is used as the echo signal for the AEC 1. Various methods can be used to control the AEC convergence process for adaptation and storage of filter coefficients in a workspace 10. In general, the adaptation is performed whenever there is a sufficient level of the reference signal and there is no near-end speech activity (that is, no double-talk) as detected by a Voice Activity Detector (VAD) within the Adaptation Control (AC) block 11. The operation of the AEC 1 in the Normal Mode is no different from other hands-free devices well known in the prior art.

To support accelerated training, two additional operating modes are provided according to the invention: Capturing Training Signals Mode (mode 2) and Processing Training Signals Mode (mode 3). All of the processing in these modes is performed concurrently with the Normal Mode (mode 1) of operation. One implementation option is to perform Mode 1 processing as a Foreground Process while modes 2 and 3 operate as a Background Process. A person of ordinary skill in the art will appreciate that the Foreground Process has highest priority (i.e. it is allocated processing resources whenever it requires them). On the other hand, a Background Process has the lowest priority and therefore is executed only when there are available resources (CPU cycles) left from the execution of the Foreground process. Scheduling of these two alternating processes can be controlled by a Process Scheduler (PS), illustrated in FIGS. 2 and 3 by reference 13. A person of skill in the art will understand that the processes and the scheduler can be implemented as Real-Time Operating System (RTOS) objects. Alternatively, they can be implemented as a simple software control loop.

Figure 4:
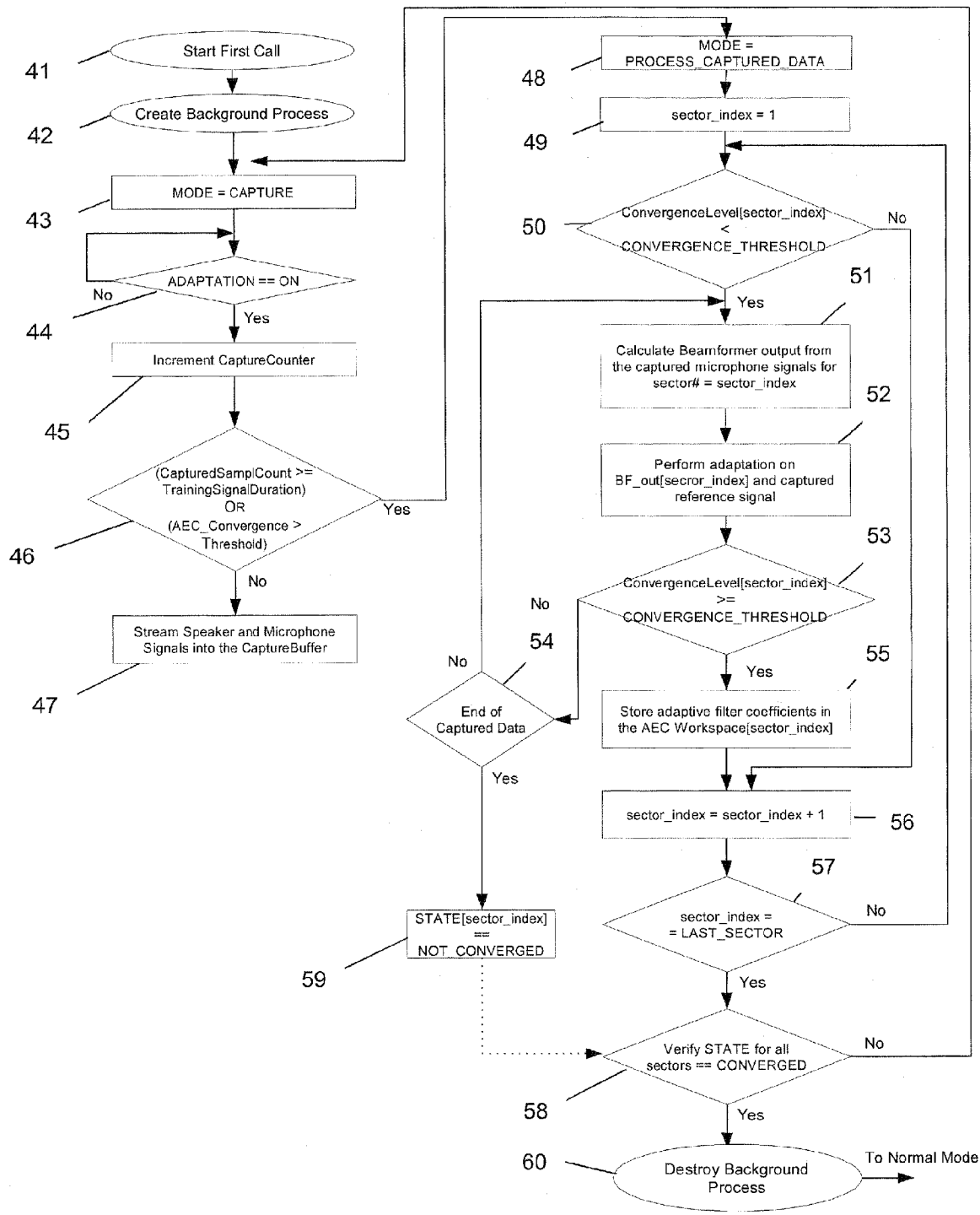
FIG. 4 is a flowchart showing the method steps according to the present invention.

As indicated above, mode 1 (Normal Mode) is constantly executed as a Foreground process and is independent from the two additional modes (modes 2 and 3). Turning now to FIG. 4, in combination with FIGS. 2 and 3, a flowchart is provided showing steps for implementing the Capturing Training Signals Mode (mode 2) and Processing Training Signals Mode (mode 3). At start-up (step 41), the Background process is created (step 42) and set in Capture Training Signals Mode (step 43 in FIG. 4 and the configuration of block diagram FIG. 2). At step 44, provided the Adaptation Control block 11 detects conditions satisfactory to perform adaptation (e.g. the presence of a far-end voice signal as a reference signal for the acoustic echo canceller and no near-end speech), then a capture counter within the Capture Control Logic block 19 is incremented (step 45) and the AEC reference signal and microphone signals are streamed into a memory buffer (Capture Buffer 15) via switches 18 (step 47), under control of Capture Control Logic block 19.

This capturing process is performed in parallel (i.e. as a Background Process) and does not interfere with the normal operation of the acoustic echo canceller 1 and the beamformer 3. Specifically, the acoustic echo canceller 1 and the beamformer 3 continue to run in the Foreground Process, thus preserving normal operation of the phone for the user. As discussed above, operation of the speakerphone at this initial stage can be half-duplex (i.e. a Switched Loss module 17 provides attenuation of the feedback signal) in order to reduce the effects of poor echo cancellation before a sufficient level of convergence is obtained.

The capturing process is carried on until Capture Control Logic 19 indicates that there is sufficient data captured in the memory buffer 15. The decision can be based on one of two criteria (a YES decision at step 46). The first criteria is whether a sufficient level of convergence has been achieved in the AEC 1 for the sector that was active while the capturing was in progress. The second criteria is met either when a Capture Mode timeout expiry is triggered due to the capture counter reaching a required number of training samples, which indicates that the Capture Buffer 15 maximum capacity is reached.

Once the Capture Mode has been completed, the Background process switches to the Processing Capture Data Mode (step 48 in FIG. 4 and the configuration of block diagram FIG. 3). In a similar fashion to mode 2, the device operates normally with respect to the far-end (loudspeaker) and the near-end (microphone) real-time signals because those signals are processed in the Foreground Process (shaded blocks in FIG. 3). However, according to the Background Process, the AEC 1 and the beamformer 3 process the captured signals whenever they are not involved in real-time signal processing and there are available CPU cycles. The switching to the Background process is performed under the control of the Process Scheduler block 13, as discussed above in connection with FIG. 2. For example, for the time periods when there is neither far-end nor near-end activity ( meaning that neither the AEC adaptation or the beamforming process are active in the Foreground Process), the microphone signals captured in the memory buffer 15 can be passed through the beamformer 3. The beamformer output is then fed (along with the captured reference signal) to the acoustic echo canceller 1, thereby enabling AEC training for consecutive look directions (e.g. sectors S=1,2 . . . , N).

Specifically, at step 49 a sector_index is initialized at "1". Provided the Convergence Level is less than a desired CONVERGENCE_THRESHOLD, then the output of beamformer 3 is calculated for the current sector_index (step 51), and adaptation is performed within AEC 1 on the beamformer output and captured reference signal (step 52). Once the Convergence Level exceeds the desired CONVERGENCE_THRESHOLD (a YES output at decision block 53), then the adaptive filter coefficients are stored in workspace 10 (step 55, explained in CA 2,413,217 referred to herein above). The sector_index is then incremented (step 56). If additional sectors remain to be adapted (i.e. a NO at decision block 57) then Training Sector Control Block 21 switches the look direction of the beamformer 3 to the next untrained sector. The training process is then repeated on the captured signals (i.e. process control returns to step 50).

If, at step 53, the Convergence Level continues to be less than the desired CONVERGENCE_THRESHOLD, and captured data from mode 2 remains to be processed (i.e. a NO decision at step 54), then process control returns to step 50.

If, on the other hand, no captured data remains to be processed, then a flag is set to indicate that the current sector is not converged (step 59), and mode 3 ends. If no additional sectors remain to be adapted (i.e. a YES at decision block 57) then a check is performed (step 58) to confirm that all sectors have been converged.

In this way, each consecutive beamformer look direction is exercised until it is either declared trained or the training data is exhausted. Once all look directions have been trained, the Background process is de-activated (destroyed) at step 60 and the device operates solely in the Normal Mode (mode 1).

If, at the end of the training procedure, some sectors have not reached the required level of convergence (i.e. a NO at step 58), then new training data is captured and the entire training sequence is repeated (i.e. process flow returns to step 43).

After the training process has been completed, the AEC coefficients workspace 10 contains adaptive filter coefficients for all look directions. The system can retrieve the adaptive filter coefficients from the corresponding sector workspace when a switch to a new look direction is initiated from the source localization unit (DOA block 9). These coefficients are then used as a starting point for adaptation on the new sector. Because these coefficients guarantee a reasonably good level of convergence as opposed to starting from scratch, there is no need to apply switched loss or other half-duplex mechanisms that degrade the full-duplex device performance.

The method according to the present invention results in a total convergence time for all sectors having a lower bound of $N \times T$, where N is the fixed number of look directions and T is the approximate time required to achieve the desired level of the echo canceller convergence for one sector. The maximum convergence time depends on how much processing power is available for the background training process on the captured signals. However, in practice, full CPU utilization is rare such that the method of the invention typically achieves faster training on captured signals compared to training with real time signals, as in the prior art.

Alternatives and variations of the invention are possible. For example, instead of using two real-time processes and a scheduler 13, modes 2 and 3 may be implemented in time slots that are free from the real-time loudspeaker/microphone signal processing. This can be achieved through monitoring of the voice activity on both the line-in (far-end) and/or the microphone (near-end) signals. For example, when there is no sufficient level of the far-end signal (double-silence, or near-end single talk), or there is a strong near-end signal (double-talk, or near-end single talk) the AEC adaptation process is normally frozen. Therefore, the processing resources that are normally consumed by the AEC 1 become available for the training process. This approach results in a simpler design (e.g. no real-time tasks switching). However it may also lead to a longer training time compared to the preferred embodiment, due to less efficient processing resources utilization (i.e. it is possible to have free CPU cycles during time intervals when the VAD is ON and the AEC is active).

The many features and advantages of the invention are apparent from the detailed specification and, thus, it is intended by the appended claims to cover all such features and advantages of the invention that fall within the sphere and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Although the present invention has been described in considerable detail with reference to certain preferred versions thereof, other versions are possible. Therefore, the spirit and scope of the appended claims should not be limited to the description of the preferred versions contained herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. §112.

What is claimed is:

1. A method to reduce total convergence time of an acoustic echo canceller in a beamformer-based audio conferencing system, comprising:

during periods of far-end speech activity, performing, as a foreground process within said acoustic echo canceller, real-time cancellation of far-end echo signals from corresponding near-end signals output from said beamformer;

during periods of far-end speech activity, capturing said far-end signals and corresponding near-end signals until one of either (i) said acoustic echo canceller is converged for a current look-direction or (ii) a predetermined number of training samples have been captured for said current look-direction; and switching from capturing to processing the captured far-end signals and near-end signals when said acoustic echo canceller is not involved in real-time signal processing to consecutively adapt and store filter coefficients for said echo canceller corresponding to each look-direction of said beamformer, processing said captured far-end and near-end signals continues until said acoustic echo canceller is converged for all look-directions of said beamformer, wherein said capturing and processing steps are background processes occurring concurrently with said foreground process such that said foreground process is not disrupted.

2. The method of claim 1, wherein said capturing and processing of far-end signals and corresponding near-end signals is performed during periods of double-silence, near-end single talk, or double-talk.

3. The method of claim 1, wherein processing of far-end signals and corresponding near-end signals further comprises feeding an output of said beamformer to said acoustic echo canceller to enable adaptation of said echo canceller coefficients for consecutive look-directions of said beamformer.

4. An audio conferencing system comprising:
a beamformer;
an acoustic echo canceller arranged to perform, as a foreground process, during periods of far-end speech activity, real-time cancellation of far-end echo signals from corresponding near-end signals output from said beamformer;
a capturing module arranged to capture, during periods of far-end speech activity, said far-end signals and corresponding near-end signals until one of either (i) said acoustic echo canceller is converged for a current look-direction or (ii) a predetermined number of training samples have been captured for said current look-direction;
a process scheduler arranged to switch between said capturing module and a processing module; and
the processing module arranged to process the captured far-end signals and near-end signals when said acoustic echo canceller is not involved in real-time signal processing to consecutively adapt and store filter coefficients for said echo canceller corresponding to each look-direction of said beamformer until said acoustic echo canceller is converged for all look-directions of said beamformer,
wherein the capturing and processing modules are arranged to perform as background processes occurring concurrently with said foreground process such that said foreground process is not disrupted.

5. An audio conferencing system according to claim 4, arranged to capture and process the far-end signals and corresponding near-end signals during periods of double-silence, near-end single talk, or double-talk.

6. An audio conferencing system according to claim 4, arranged to process the far-end signals and corresponding near-end signals by feeding an output of said beamformer to said acoustic echo canceller to enable adaptation of said echo canceller coefficients for consecutive look-directions of said beamformer.

* * * * *